Feb. 4, 1958 S. DUINKER ET AL 2,822,533
DEVICE FOR READING MAGNETICALLY RECORDED MEMORY ELEMENTS
Filed July 8, 1954 2 Sheets-Sheet 1

INVENTORS
SIMON DUINKER
DERK KLEIS
WILLEM KLAAS WESTMIJZE
BY Fred M. Vogel
AGENT

DEVICE FOR READING MAGNETICALLY RECORDED MEMORY ELEMENTS

Filed July 8, 1954 2 Sheets-Sheet 2

INVENTORS
SIMON DUINKER
DERK KLEIS
WILLEM KLAAS WESTMIJZE
BY
[signature]
AGENT

United States Patent Office 2,822,533
Patented Feb. 4, 1958

2,822,533

DEVICE FOR READING MAGNETICALLY RECORDED MEMORY ELEMENTS

Simon Duinker, Derk Kleis, and Willem Klaas Westmijze, Eindhoven, Netherlands, assignors, by mesne assignments, to North American Philips Company, Inc., New York, N. Y., a corporation of Delaware Application July 8, 1954, Serial No. 442,086

Claims priority, application Netherlands July 15, 1953

3 Claims. (Cl. 340—174)

The invention relates to a device for reading codified memory elements, recorded magnetically on suitable material, for example a tape for magnetic recording and reproducing or a cylinder coated with suitable magnetic material.

For reading of codified memory elements recorded on a tape or a cylinder, it is common practice to use a magnetic scanning head comprising a magnetic circuit with a reading winding, across which voltages occur, which are further amplified by electronic means.

However, devices are known which have an advantage over the said magnetic recording and reproducing head in that the final signal is less distorted and in that, moreover, this signal can be amplified to the desired value by means of a smaller number of amplifying stages. Such devices comprise a circuit of magnetic material, part of this circuit being formed by two magnetically identical parallel branches of a material, the polarisation or magnetization characteristic curve of which is not linear, fluxes being produced across these parallel branches by means of a current of constant fundamental frequency passing through windings on the two branches and supplied by a source of alternating current connected to these windings and controlling the parallel branches in the non-linear part of their polarisation characteristic, the flux components having the said fundamental frequency compensating one another in a common undivided part of the magnetic circuit. Such devices constitute a combination of a magnetic scanning head and a magnetic modulator. The magnetic flux produced in the parallel branches by the alternating current is modulated by the scanned magnetic fields from the tape or cylinder. This modulated magnetic flux or components thereof is converted with the aid of an output winding provided on the magnetic circuit into an alternating voltage, which subsequent to demodulation, yields a current or a voltage proportional to the scanned magnetic field. This construction is described in United States Patent No. 2,608,621.

The invention has for its object to provide a material improvement in such devices for reading codified memory elements recorded magnetically on suitable material and is characterized in that, subsequent to demodulation of the voltages, the signals resulting from the carrier-wave frequencies which are even-numbered multiples of the fundamental frequency of the generated alternating current and which are induced into the output winding surrounding the magnetic circuit by the fluxes modulated by the read signal fluxes are fed back to another winding provided on the magnetic circuit and having a winding sense such that the read signal flux from the tape or cyclinder is supported or aided to an extent such that instability occurs in the relationship between the signal fluxes and the said induced voltages.

Figure 1:
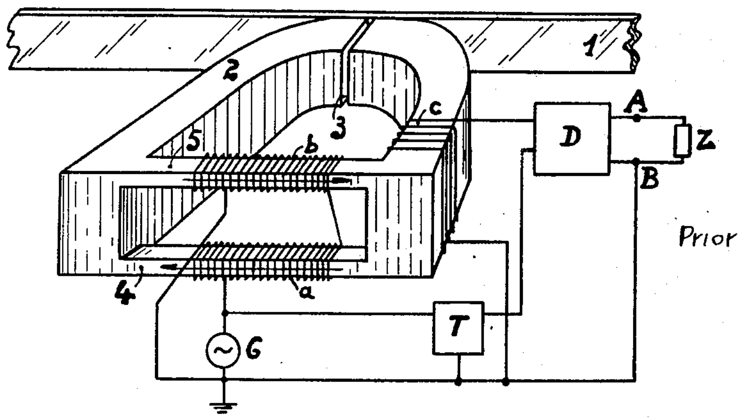
Prior Art Fig. 1.
Figure 2:
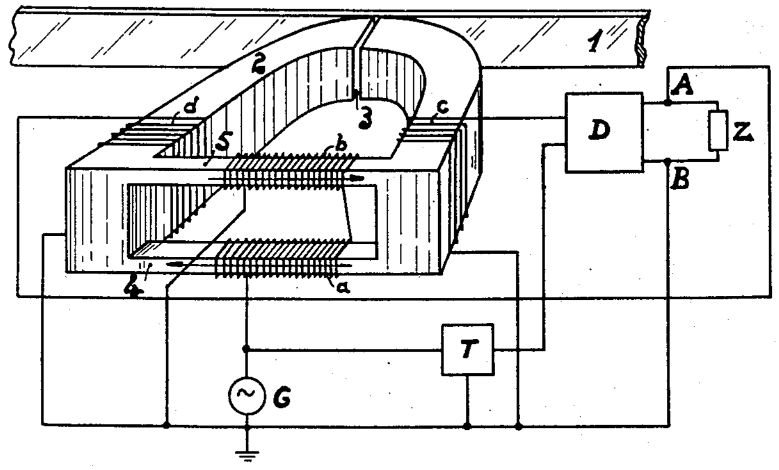
Figure 3:
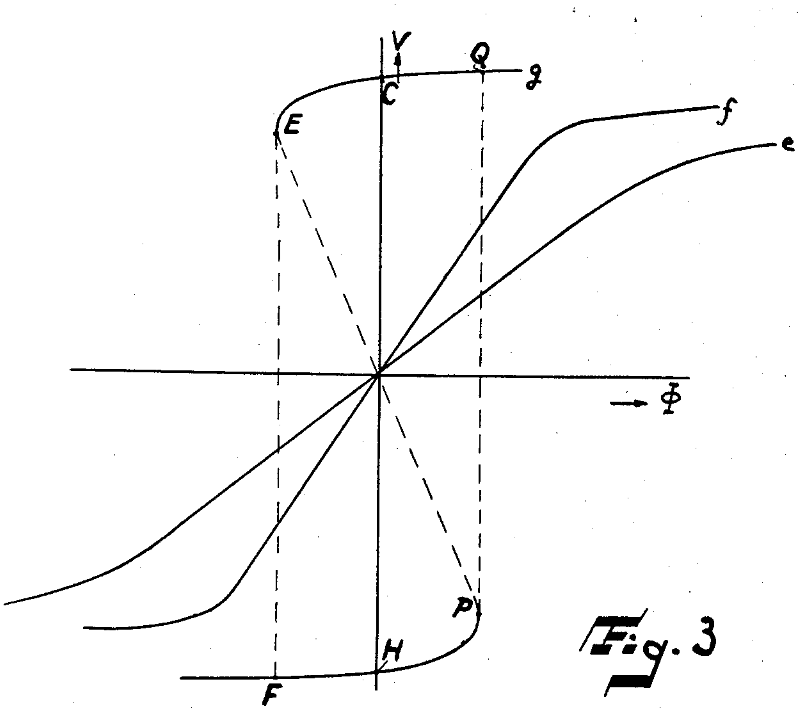

The invention will now be described with reference to the accompanying drawing in which:

Fig. 1 shows a known device,

Fig. 2 a device according to the invention,

Fig. 3 shows curves indicating the relationship between the input flux and the output voltage occurring in devices as shown in Figs. 1 and 2, and Fig. 4 shows curves clarifying further the operation of the device according to the invention.

Fig. 1 shows a known device as described in the aforementioned U. S. patent which may be used in a magnetic recording and reproducing device as a reproducing head. Reference numeral 1 designates the magnetic tape with the magnetic field to be scanned, 2 the magnetic circuit having a field gap 3 and the two magnetically substantially identical parallel branches 4 and 5, made from a material, of which the polarisation or magnetization characteristic has a non-linear form. The term "magnetically identical branches" is to be understood to mean branches, of which the polarisation characteristics, reluctances and so on are equal. References *a* and *b* designate identical windings, the winding sense of which is such that, if the fundamental-frequency component of the flux produced by an alternating-current generator G has the direction indicated by the arrow at 4, this component has an opposite direction at 5.

If no field on the tape 1 to be scanned prevails, no flux will as is know prevail in the undivided common part of the magnetic circuit, for example at the area of an output winding *c*; however, if a field prevails, a modulated alternating current flux occurs in the undivided part and hence also at the area of the winding *c*, the components of this flux, modulated each by the magnetic fields to be reproduced, having carrier-wave frequencies which are even-numbered multiples of the fundamental frequency of the flux produced by the generator G in the parallel branches, these carrier-waves themselves being, however, completely suppressed. The winding *c* thus has a voltage induced therein, the components of which, modulated each by the magnetic fields to be reproduced, have carrier-wave frequencies which are also even-numbered multiples of the fundamental frequency of the flux produced by the generator G in the parallel branches, the carrier-waves themselves being, however, again completely suppressed. In order to detect these voltages, they are fed to a phase-sensitive detector D, to which also the carrier-waves themselves must be supplied. For detection there will, in general, be used that component which has a carrier-wave frequency which is twice the frequency produced by the generator G. In this case, the oscillation produced by the generator G is also supplied to a frequency multiplier T, the output oscillation of which is supplied in the correct phase to the detector D. The desired output signals can then be derived from the terminals A and B through the impedance Z. By providing a suitable preliminary polarisation, the use of a phase-sensitive detector may be dispensed with.

Fig. 2 shows a device according to the invention. The corresponding elements of this device are designated by the same reference numerals as in Fig. 1. Parallel (as is indicated in the figure) or in series with the impedance Z, provision is made of a winding *d*, also surrounding the magnetic circuit, the winding sense of which is such that the fluxes read from the tape 1 are supported, i. e., the flux from the tape 1 and that produced by the winding *d* are in additive relationship.

Fig. 3 shows the relationship between the input flux from the tape 1 and the phase of the output alternating current voltage V induced in the winding *c*. Also, the ordinate in Fig. 3 can represent the magnitude and polarity of the direct current voltage produced across the impedance Z after demodulation, positive being above the horizontal and negative below the horizontal. The voltage V is produced by alternating current fluxes the carrier-wave frequency of which is an even-numbered multiple of the frequency of the oscillation produced by the generator G. The symmetry of the curves *e*, *f* and *g* about the origin indicates that the phase of this voltage rotates by $\pi$ radians if $\Phi$ reverses in polarity. Curve *e* indicates said relationship if no feed-back is used, as in the known device illustrated in Fig. 1. Curve *f* is produced if use is made of comparatively slight feed-back, and curve *g* results if so-called over-critical feed-back is used. The latter curve has a part with a negative slope, which is unstable. For curve *g*, if $\Phi=0$, C and H are the only states of equilibrium. If V is for example at C, if $\Phi=0$, V will, if $\Phi$ increases, move along the branch CQ of curve *g*; however, if $\Phi$ decreases to negative values, a discontinuous transition takes place from E to F. If $\Phi$ becomes again zero, the state of equilibrium will be characterized by point H. However, at an increase in $\Phi$, a discontinuous transition will take place through P to Q. In other words, the device of the invention is essentially a binary system that exhibits only two stable states. Changes in the input flux from the tape or cylinder are either insufficient to change the polarity of the voltage across the impedance Z, or are sufficient to cause a reversal of polarity of the voltage across the impedance Z. In any event, the magnitude of that voltage remains substantially the same.

Figures 4A, 4B, 4C:
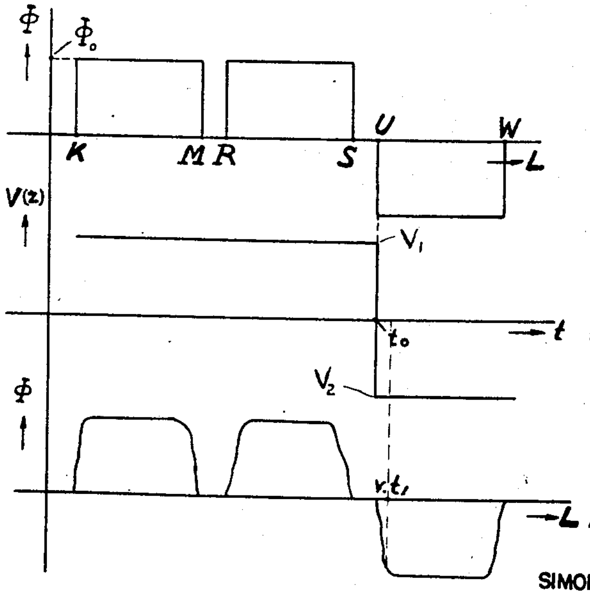

Such a characteristic as illustrated in curve *g* of Fig. 3 has various advantages in reading codified memory elements recorded on magnetic tape or on magnetic cylinders, such as used for example for counting purposes or for pulse-code modulation systems. Herein, signal fluxes of two kinds are distinguished, for example a positive flux corresponding to "1" and a negative flux corresponding to "0," as is indicated in Fig. 4*a*, in which $\Phi$ is plotted as a function of the length L of the tape or the cylinder in the reading device. Between points K and M and also between points R and S an "1" is recorded; between points U and W a "0." With the aid of a device according to the invention, such memory elements are reproduced as is indicated in Fig. 4*b*, in which the output direct current voltage V across the impedance Z is plotted as a function of time *t*, L being equal to *v*. *t*, wherein *v* designates the velocity of the tape or the cylinder along the field gap 3. The transition from $V_1$ to $V_2$ at the time $t_0$ is very sharp, even if the waveform of the original pulses on the tape is as is shown in Fig. 4*c*. The sharp transition will, in such a case, not lie exactly at $t_0$, but at a slightly later instant, at $t_1$. Consequently, even if the original pulses are strongly distorted, or if they have a very unfavourable signal-to-noise ratio, the sequence reproduced by the device according to the invention has yet the desired sharp transitions between "1" and "0," any time lag, which is otherwise negligible, being left out of consideration. In accordance with the use, the impedance Z may be constituted for example by a differentiating circuit or a magnetic recording head.

It should be noted that $\Phi_0$, the magnitude of the flux recorded on the tape or the cylinder, must naturally exceed the $\Phi$ or, be at least equal to the $\Phi$, at which the discontinuous transitions occur.

The amplification furnished by a device according to the invention is, moreover, such that in general already one stage of electronic amplification, carried out prior to or subsequent to demodulation will suffice. Moreover, owing to this feed-back, the input reluctance of the magnetic circuit decreases, so that a comparatively larger part of the signal flux traverses the head and a smaller part passes through the field gap as a leakage flux.

The use of a device according to the invention for reading codified memory elements from a magnetic tape or cylinder has a further advantage in that, if the pulses recorded on this tape or cylinder are distorted, as is indicated in Fig. 4*c*, these pulses may regain the correct waveform owing to the reaction of the fed-back flux on the tape or the cylinder, this reaction being dependent among other things, upon the form and the dimensions of the field gap; this may be of importance in subsequent re-reading even by means of a device not in accordance with the invention. This feed-back flux has not only the same direction as the initial flux recorded on the tape or the cylinder, but it has also invariably the desired form with the sharp transitions between "1" and "0," in connection with the discontinuities in the relationship between the input flux and the output voltage across the winding *c*. This implies of course also that, if the recorded flux has the correct shape, as is indicated in Fig. 4*a*, this correct shape is at any rate not affected by the said reaction.

What is claimed is:

1. A magnetic device for interaction with a magnetic medium, comprising a magnetic circuit, said circuit including two substantially magnetically parallel and identical branches each constituted of ferromagnetic material having a non-linear magnetization characteristic, and a ferromagnetic portion including a gap and common to both of said branches, a winding coupled to each of said branches and wound to produce fluxes in opposite directions through said branches whereby these fluxes tend to cancel one another in the common ferromagnetic portion; a source of alternating current connected to said windings on the branches; output means coupled to said circuit for deriving an output voltage therefrom dependent upon the flux condition of the common ferromagnetic portion; a winding coupled to said common ferromagnetic portion; and means coupled to said output means and to said winding on said common ferromagnetic portion for feeding back a portion of the output voltage to the magnetic circuit to produce a flux therein, the flux produced by said fed-back voltage and that produced by interaction between the gap and the magnetic medium being in additive relationship.

2. A magnetic device for interaction with a magnetic medium containing stored magnetic signals, comprising a ferromagnetic core having two substantially magnetic parallel and identical branches each constituted of ferromagnetic material having a non-linear polarization characteristic and a core portion containing a gap and common to both of said branches, a first winding on one of said branches for producing a flux therein in a given direction, a second winding on the other of said branches for producing a flux therein in the opposite direction, a source of alternating current at a fundamental frequency coupled to said first and second windings to excite the associated branches in the non-linear part of their polarization characteristic, a third output winding on said common core portion from which a voltage is derived containing even harmonics of the fundamental frequency as a carrier modulated by the magnetic signals on said magnetic medium, which is positioned to interact with the gap in the common core portion to produce fluxes therein, detection means coupled to said third winding for removing the modulation from the voltages derived from the output winding, a fourth winding on the common core portion, and means coupling the modulation from the detector to the fourth winding to produce fluxes in the common core portion, the fourth winding being wound such that the fluxes produced by it in the common core portion and the fluxes produced by the magnetic signals on the magnetic medium in the common core portion are in additive relationship whereby an unstable relationship exists in part between the magnetic signals and the voltages induced in the third winding.

3. A magnetic device comprising a ferromagnetic core having two parallel identical portions and a common portion including a gap for introducing input signals into said core, windings on said parallel portions, an alternating current source coupled to said windings to produce alternating current fluxes therein of the same magnitude but in opposite directions, output means for deriving output voltages from said common portion resulting from the interaction of the flux due to the input signals and the alternating current fluxes, and means for introducing a flux into said common portion derived from said output voltages, whereby said device assumes a bistable nature.

References Cited in the file of this patent

UNITED STATES PATENTS

| | | |
|---|---|---|
| 2,590,091 | Devol | Mar. 25, 1952 |
| 2,608,621 | Peterson | Aug. 26, 1952 |
| 2,649,568 | Felch | Aug. 18, 1953 |